(12) United States Patent
Kakuya et al.

(10) Patent No.: US 6,967,692 B1
(45) Date of Patent: Nov. 22, 2005

(54) APPARATUS FOR PROCESSING LUMINANCE SIGNAL

(75) Inventors: Yuki Kakuya, Osaka (JP); Atsuhisa Kageyama, Ibaraki (JP); Nobutaka Okada, Suita (JP); Keiichi Ito, Osaka (JP)

(73) Assignee: Matsushita Electric Industrial Co., Ltd., (JP)

( * ) Notice: Subject to any disclaimer, the term of this patent is extended or adjusted under 35 U.S.C. 154(b) by 410 days.

(21) Appl. No.: 10/130,624

(22) PCT Filed: Nov. 24, 2000

(86) PCT No.: PCT/JP00/08276

§ 371 (c)(1),
(2), (4) Date: Aug. 12, 2002

(87) PCT Pub. No.: WO01/39489

PCT Pub. Date: May 31, 2001

(30) Foreign Application Priority Data

Nov. 25, 1999  (JP) ................................ 11/333881

(51) Int. Cl.⁷ ............................. H04N 9/77; H04N 5/57
(52) U.S. Cl. ...................................... 348/712; 348/687
(58) Field of Search ................................ 348/712, 708, 348/687, 690, 663, 666, 673, 675; H04N 9/77, H04N 5/57, 9/64, 5/14

(56) References Cited

U.S. PATENT DOCUMENTS

| 5,671,022 | A | | 9/1997 | Ishida ......................... 348/659 |
| 5,739,871 | A | * | 4/1998 | Kim ............................ 348/687 |
| 5,805,238 | A | * | 9/1998 | Raby et al. .................. 348/666 |
| 6,313,883 | B1 | * | 11/2001 | Thaler ......................... 348/712 |

FOREIGN PATENT DOCUMENTS

| JP | 08-009196 | 1/1996 |
| JP | 08-202319 | 8/1996 |

* cited by examiner

*Primary Examiner*—Sherrie Hsia
(74) *Attorney, Agent, or Firm*—Steptoe & Johnson LLP

(57) ABSTRACT

A luminance signal processing apparatus that detects an average luminance level, adaptively to various video signal formats. This luminance signal processing apparatus includes a window pulse generation unit 101 for generating a window pulse signal S110 that indicates a period during which a luminance signal of an input video signal is sampled; a luminance value addition unit 102 for obtaining a total sum of luminance values of the luminance signal in the period indicated by the window pulse signal S110; a number-of-pixel addition unit 103 for obtaining the number of pixels in the period indicated by the window pulse signal S110; a bit shift unit 104 for bit-shifting an output signal of the luminance value addition unit 102 and an output signal of the number-of-pixel addition unit 103, respectively; and a division unit 105 for dividing the bit-shifted output signal of the luminance value addition unit 102 by the bit-shifted output signal of the number-of-pixel addition unit 103, thereby obtaining an average luminance level.

3 Claims, 8 Drawing Sheets

Fig.7(a)
| I line | 00 | 01 | 10 | 11 | 00 | 01 | 10 | 11 |
|---|---|---|---|---|---|---|---|---|
| ⋮ | 01 | 10 | 11 | 00 | 01 | 10 | 11 | 00 |
| ⋮ | 10 | 11 | 00 | 01 | 10 | 11 | 00 | 01 |
| ⋮ | 11 | 00 | 01 | 10 | 11 | 00 | 01 | 10 |
| ⋮ | 00 | 01 | 10 | 11 | 00 | 01 | 10 | 11 |
Fig.7(b)
I line
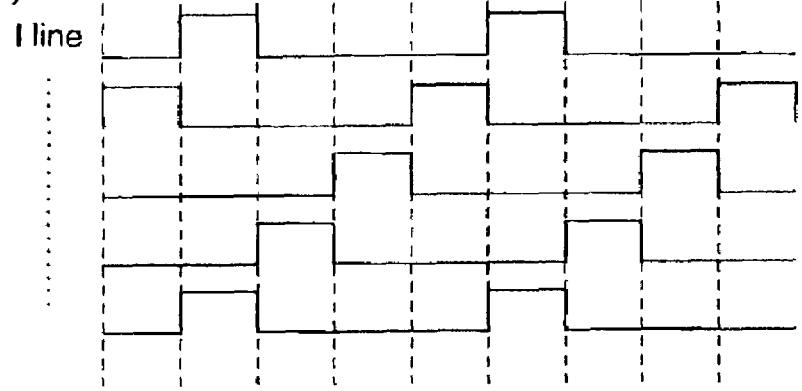
Fig.7(c)
I line
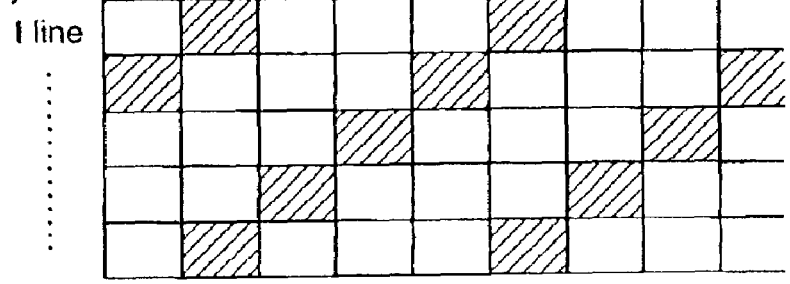

APPARATUS FOR PROCESSING LUMINANCE SIGNAL

TECHNICAL FIELD

The present invention relates to a technique for detecting an average luminance level of a luminance signal of a video signal.

BACKGROUND OF THE INVENTION

As a conventional apparatus for detecting an average luminance level of a video signal, there is known a video signal level detection apparatus that is disclosed in Japanese Published Patent Application No. Hei8-202319.

FIG. 8 is a block diagram illustrating the structure of the conventional video signal level detection apparatus.

This video signal level detection apparatus includes an input terminal 1001 for receiving luminance signal data that is separated from a video signal, an average calculation unit 1002 for calculating an average of pixel data corresponding to the inputted luminance signal data, for every n pieces, a data integration unit 1003 for integrating the data obtained by the average calculation unit 1002 for each screen, a division unit 1004 for dividing the data integrated by the integration unit 1003 by a constant that is obtained by dividing the number of pixels displayed on one screen by n, to detect an average luminance level, and a decoder 1005 for outputting the average luminance level.

The average calculation unit 1002 includes a first flip-flop circuit for latching the luminance signal data, an adder for adding pixel data of the luminance signal, a second flip-flop circuit for latching the added data, and a third flipflop circuit for extracting a predetermined number of bits starting from a Most Significant Bit (hereinafter abbreviated as MSB) of data that is outputted from the adder and outputting the extracted bits to the data integration unit 1003.

When the luminance signal data is inputted, the average calculation unit 1002 adds pixel data corresponding to the luminance signal for every n pieces, by means of the adder and the second flipflop circuit, extracts the predetermined number of bits starting from the MSB of the data that is outputted from the adder, and latches the data by means of the third flip-flop circuit, thereby calculating the average luminance level of pixel data corresponding to the luminance signal for every n pieces. The integration unit 1003 integrates the data obtained by the average calculation unit 1002 for each screen. The division unit 1004 divides the data integrated by the data integration unit 1003 by a constant that is obtained by dividing the number of pixels displayed on one screen by n, thereby detecting the average luminance level of the video signal.

According to the video signal level detection apparatus configured as described above, the average luminance level of pixel data corresponding to the luminance signal can be calculated for every n pieces. Then, on the basis of the calculated average luminance level, the average luminance level of the entire display screen is calculated. Therefore, the average luminance level of all pixel data can be detected with a small scale circuit.

The average luminance level of the video signal is often used as a modification effect control value when the picture quality is to be modified. In addition, with advances in the broadcasting technology, video signal formats have been increasingly diversified, and there are formats corresponding to 480i, 480p, 720p, 1080i and the like. Accordingly, it is required that the average luminance level of the video signal should be detected adaptively to the respective video signal formats, with great accuracy and without increasing the circuit scale.

However, when as in the conventional video signal level detection apparatus, pixel data corresponding to the luminance signal are added for every n pieces, the predetermined number of bits are extracted starting from the MSB of a signal indicating the addition result to calculate the average luminance level of pixel data corresponding to the luminance signal for every n pieces, and the average luminance level of the entire display screen is detected on the basis of this calculated average luminance level, the data concentrate more on lower-order bits in such a video signal format having fewer significant pixels and more higher-order bits remain unused, as the number of significant pixels in the video signal depends on the video signal formats, and therefore, the lower-order bits as effective values are cut down, thereby increasing a rounding error. Consequently, the accuracy of the average luminance level is decreased.

In addition to the apparatus disclosed in the above-mentioned application, there is commonly known a system in which, in order to reduce the circuit scale, luminance signals are thinned out to provide an average luminance level. However, in this system, pixels are taken out at the same positions on respective scanning lines, i.e., pixels are taken out from the scanning lines with a ratio of 1/8. Therefore, in cases where pictures of fixed patterns or repetitive patterns appear on the display screen, accurate average luminance levels cannot be detected.

The present invention is made to solve the above-mentioned problems, and has for its object to provide a luminance signal detection apparatus which can detect an average luminance level adaptively to various video signal formats, with a small scale circuit and with great accuracy.

BRIEF SUMMARY OF THE INVENTION

A luminance signal processing apparatus of the present invention includes: a window pulse generation means for generating a window pulse signal that indicates a period during which a luminance signal of an input video signal is sampled; a luminance value addition means for obtaining a total sum of luminance values of the luminance signal in the period indicated by the window pulse signal; a number-of-pixel addition means for obtaining the number of pixels in the period indicated by the window pulse signal; a bit shift means for detecting a significant bit from an output signal of the number-of-pixel addition means, and bit-shifting the output signal of the number-of-pixel addition means and an output signal of the luminance value addition means, respectively, on the basis of the significant bit; and a division means for dividing the bit-shifted output signal of the luminance value addition means, by the bit-shifted output signal of the number-of-pixel addition means, thereby obtaining an average luminance level in the period during which the luminance signal is sampled.

According to this invention, the average luminance level can be detected adaptively to plural video signal formats that have different numbers of significant pixels, by a small scale circuit with great accuracy while minimizing a rounded error.

In the luminance signal processing apparatus the bit shift means may include: a significant bit detection means for shifting the output signal of the number-of-pixel addition means successively from its most significant bit, and detecting a significant bit; a number-of-pixel bit shift means for extracting a predetermined number of bits from the output signal of the number-of-pixel addition means on the basis of an output signal of the significant bit detection means; and a luminance value bit shift means for extracting the predetermined number of bits from the output signal of the luminance value addition means on the basis of the output signal of the significant bit detection means.

According to the present invention, the average luminance level can be detected adaptively to plural video signal formats that have different numbers of significant pixels by a small scale circuit with great accuracy while minimizing a rounded error.

And, in the luminance signal processing apparatus the window pulse generation means may additionally include: a differentiation means for detecting rising or falling edges of a horizontal synchronizing signal and a vertical synchronizing signal of the input video signal, differentiating the same, and outputting a horizontal differential signal and a vertical differential signal; a thinning reference value set means that includes: a first counter which is reset in accordance with the vertical differential signal, and counts values which are loaded in accordance with the horizontal differential signal, thereby counting the number of lines; and a second counter for n bits, which is reset in accordance with the horizontal differential signal and counts a reference clock with taking a value corresponding to less significant n bits which are extracted from a value that is obtained by loading an output of the first counter, as an initial value, and outputs a value which is counted being shifted by one for each line, as a thinning reference value that is used when values of the luminance signal to be sampled are taken out; and a sampling means for receiving a vertical period start point signal, a vertical period end point signal, a horizontal period start point signal and a horizontal period end point signal, being reset in accordance with the vertical differential signal, obtaining a period indicated by the vertical period start point signal and the vertical period end point signal, within a vertical period that is obtained by counting values loaded in accordance with the horizontal differential signal, as a first significant period, further being reset in accordance with the horizontal differential signal, obtaining a period indicated by the horizontal period start point signal and the horizontal period end point signal, within a horizontal period that is obtained by counting a reference clock, as a second significant period, then generating a thinning pulse when the thinning reference value matches a predetermined value, and generating a window pulse signal indicating a period that is common among the first significant period, the second significant period and the thinning pulse.

According to the present invention, when the average luminance level is obtained, the total sums of the luminance values and the number of pixels can be reduced, and the circuit scale can be decreased.

BRIEF DESCRIPTION OF THE DRAWINGS

FIG. 7($a$) is a schematic view showing a thinning reference value according to the second embodiment to correspond to a display screen.

FIG. 7($b$) is a schematic view showing a window pulse signal according to the second embodiment.

FIG. 7($c$) is a schematic view showing a window pulse signal according to the second embodiment to correspond to the display screen.

DETAILED DESCRIPTION OF, AND BEST MODE FOR CARRYING OUT, THE INVENTION

Embodiment 1

Figure 1:
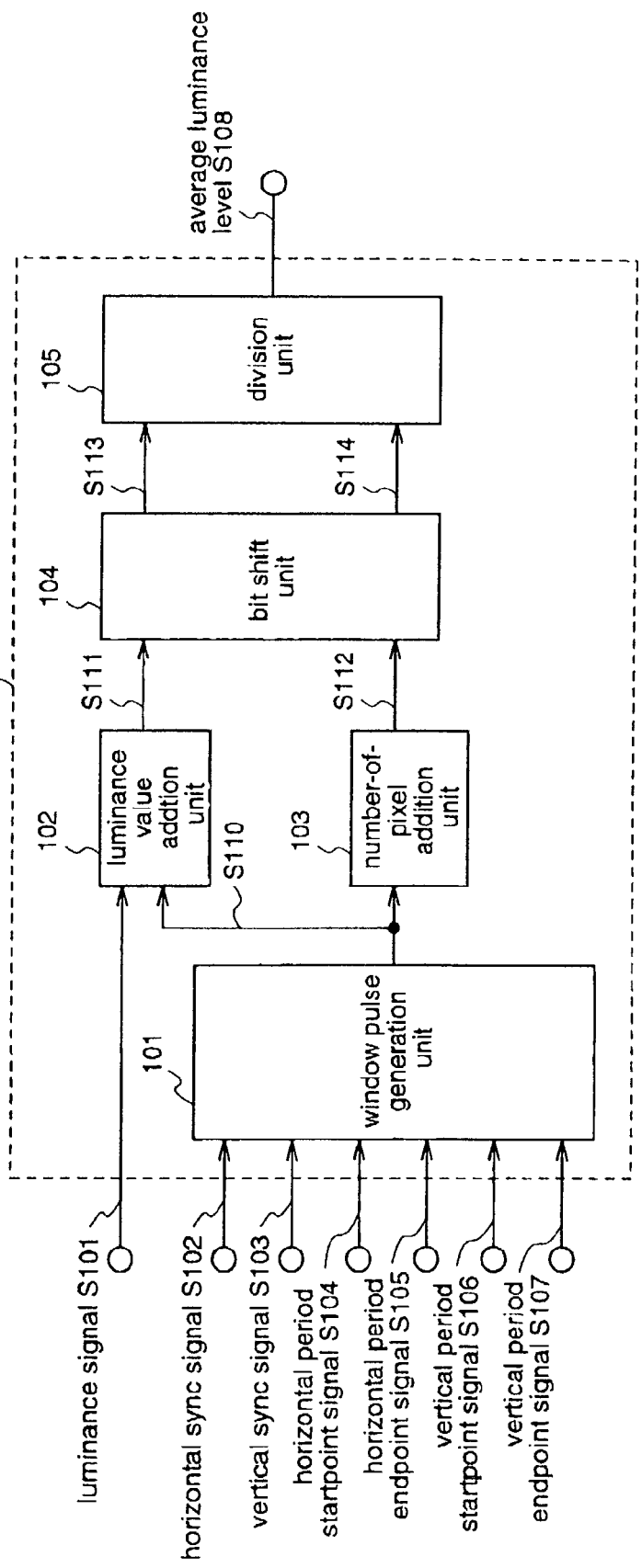
FIG. 1 is a block diagram illustrating a structure of a luminance signal processing apparatus according to a first embodiment of the present invention.

FIG. 1 is a block diagram illustrating a luminance signal processing apparatus according to a first embodiment of the present invention.

A luminance signal processing apparatus 100 receives a luminance signal S101, a horizontal synchronizing signal S102, and a vertical synchronizing signal S103 which are extracted from an input video signal to be processed, as well as a horizontal period start point signal S104, a horizontal period endpoint signal S105, a vertical period start point signal S106, and a vertical period end point signal S107 which are arbitrarily set from outside, and detects an average luminance level S108. All circuits in the luminance signal processing apparatus 100 operate in accordance with a reference signal.

The horizontal period start point signal S104 and the horizontal period end point signal S105 are signals indicating a start point value and an end point value, respectively, on the horizontal side when the luminance signal is sampled. The vertical period start point signal S106 and the vertical period end point signal S107 are signals indicating a start point value and an end point value, respectively, on the vertical side when the luminance signal is sampled.

A window pulse generation unit 101 receives the horizontal sync signal S102, the vertical sync signal S103, the horizontal period start point signal S104, the horizontal period end point signal S105, the vertical period start point signal S106 and the vertical period end point signal S107, and generates a window pulse signal S110 indicating a period during which the luminance signal is sampled.

A luminance value addition unit 102 receives the window pulse signal S110 and the luminance signal S101 to be processed, adds luminance values in the period indicated by the window pulse signal S110 to obtain the total sum, and outputs a luminance value total sum signal S111.

A number-of-pixel addition unit 103 receives the window pulse signal S110, adds the numbers of pixels in the period indicated by the window pulse signal S110 to obtain the total sum, and outputs a number-of-pixel total sum signal S112.

A bit shift unit 104 performs bit shifts successively from the MSB of the number-of-pixel total sum signal S112, and finds a first bit "1", thereby detecting a significant bit indicating which bit counting from the MSB is significant. Then, on the basis of this significant bit, the bit shift unit 104 outputs a shifted total luminance sum signal S113 that is obtained by extracting a required number of bits from the luminance value total sum signal S111, as well as outputs a shifted total pixel sum signal S114 that is obtained by extracting a required number of bits from the number-of-pixel total sum signal S112, on the basis of this significant bit.

A division unit 105 receives the shifted total luminance sum signal S113 and the shifted total pixel sum signal S114, and divides the shifted total luminance sum signal S113 by the shifted total pixel sum signal S114, thereby outputting an average luminance level S108.

Figure 2:
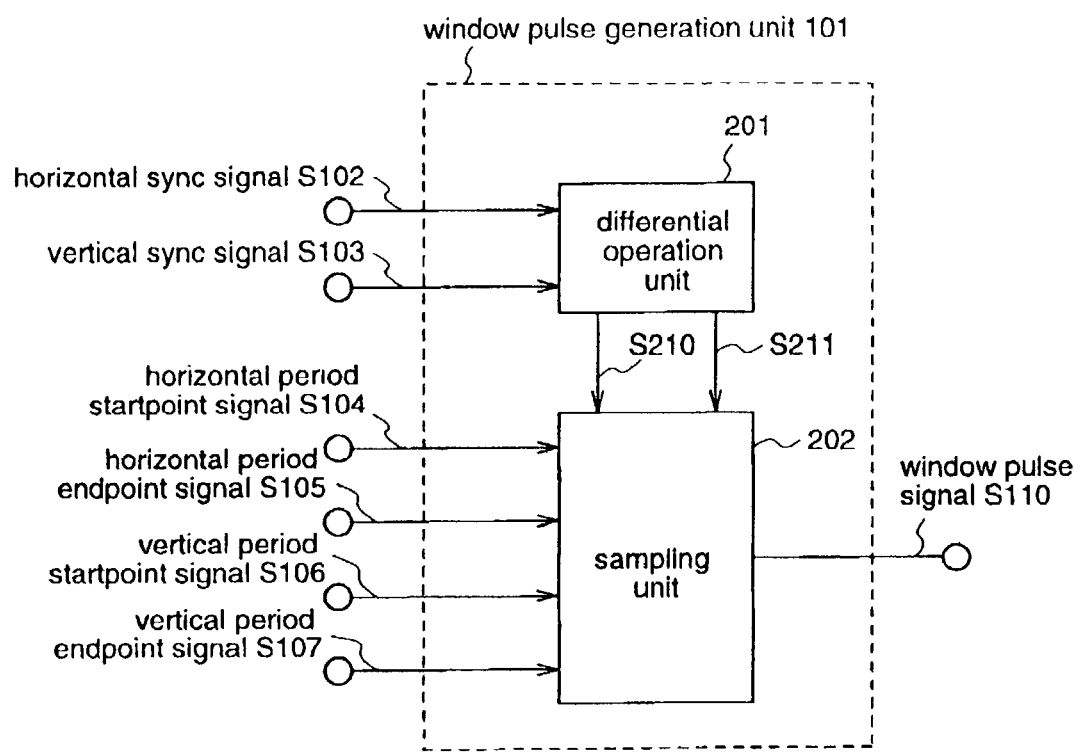
FIG. 2 is a block diagram illustrating a detailed structure of a window pulse generation unit according to the first embodiment.

FIG. 2 is a block diagram illustrating a detailed structure of the window pulse generation unit 101, which will be described hereinafter.

A differential operation unit 201 receives the horizontal sync signal S102 and the vertical sync signal S103 which are extracted from the video signal, detects a rising or falling edge of the horizontal sync signal S102, and outputs a differentiated signal, i.e., a horizontal differential signal S210. The differential operation unit 201 further detects a rising or falling edge of the vertical sync signal S103, and outputs a differentiated signal, i.e., a vertical differential signal S211.

The sampling unit 201 receives the horizontal period start point signal S104, the horizontal period end point signal S105, the vertical period start point signal S106, the vertical period end point signal S107, the horizontal differential signal S210 and the vertical differential signal S211, and decides a window pulse signal S110 indicating a period for sampling the luminance signal. The sampling unit 202 is reset in accordance with the horizontal differential signal S210, and counts a reference clock, thereby calculating a horizontal period. Then, the sampling unit 202 sets a significant period within the horizontal period, indicated by the horizontal period start point signal S104 and the horizontal period end point signal 3105, as a horizontal window. In addition, the sampling unit 202 is reset in accordance with the vertical differential signal S211, and counts values loaded in accordance with the horizontal differential signal S210, thereby calculating a vertical period. Then, the sampling unit 202 sets a significant period within the vertical period, indicated by the vertical period start point signal S106 and the vertical period end point signal S107, as a vertical window.

A signal indicating a period that is common to the horizontal window signal and the vertical window signal is a window pulse signal S110. This common period is a period during which the luminance signal is sampled.

Figure 3:
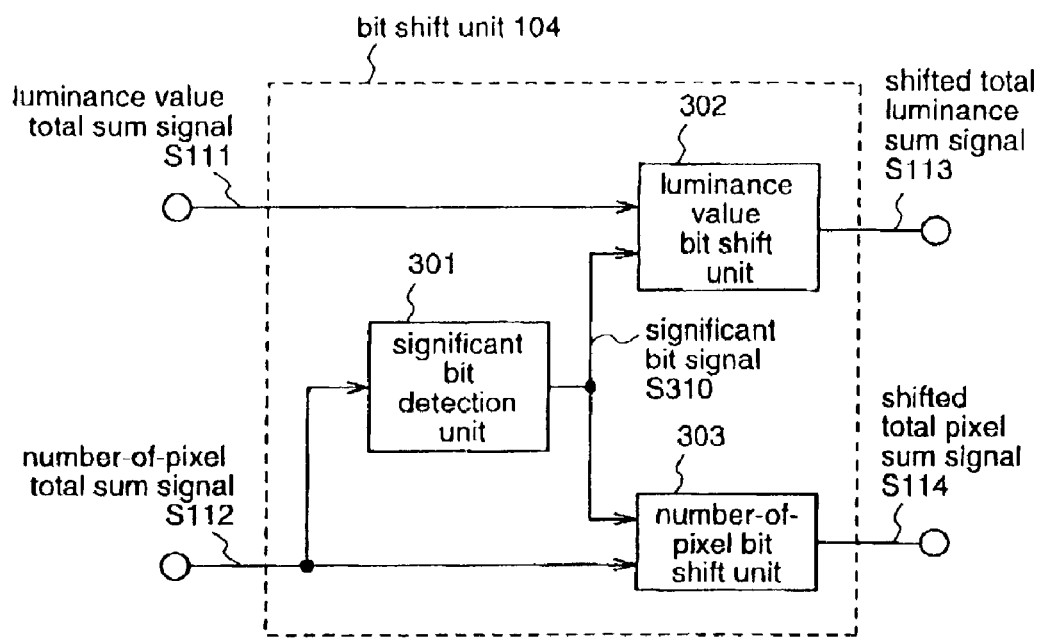
FIG. 3 is a block diagram illustrating a detailed structure of a bit shift unit according to the first embodiment.

FIG. 3 is a block diagram illustrating a detailed structure of the bit shift unit 104, which will be described hereinafter.

A significant bit detection unit 301 receives the number-of-pixel total sum signal S112, performs bit shift from the MSB of the number-of-pixel total sum signal S112 toward lower-order bits, to detect a first bit "1", i.e., a significant bit, and outputs a significant bit signal S310 indicating which bit counting from the MSB is the significant bit.

A luminance value bit shift unit 302 receives the luminance value total sum signal S111 and the significant bit signal S301, and outputs a shifted total luminance sum signal S113 that is obtained by extracting a required number of bits from the luminance value total sum signal S111, on the basis of the significant bit signal S310.

A number-of-pixel bit shift unit 303 receives the number-of-pixel total sum signal S112 and the significant bit signal S310, and outputs a shifted total number-of-pixel sum signal S114 that is obtained by extracting a required number of bits from the number-of-pixel total sum signal S112, on the basis of the significant bit signal S310.

Figure 4:
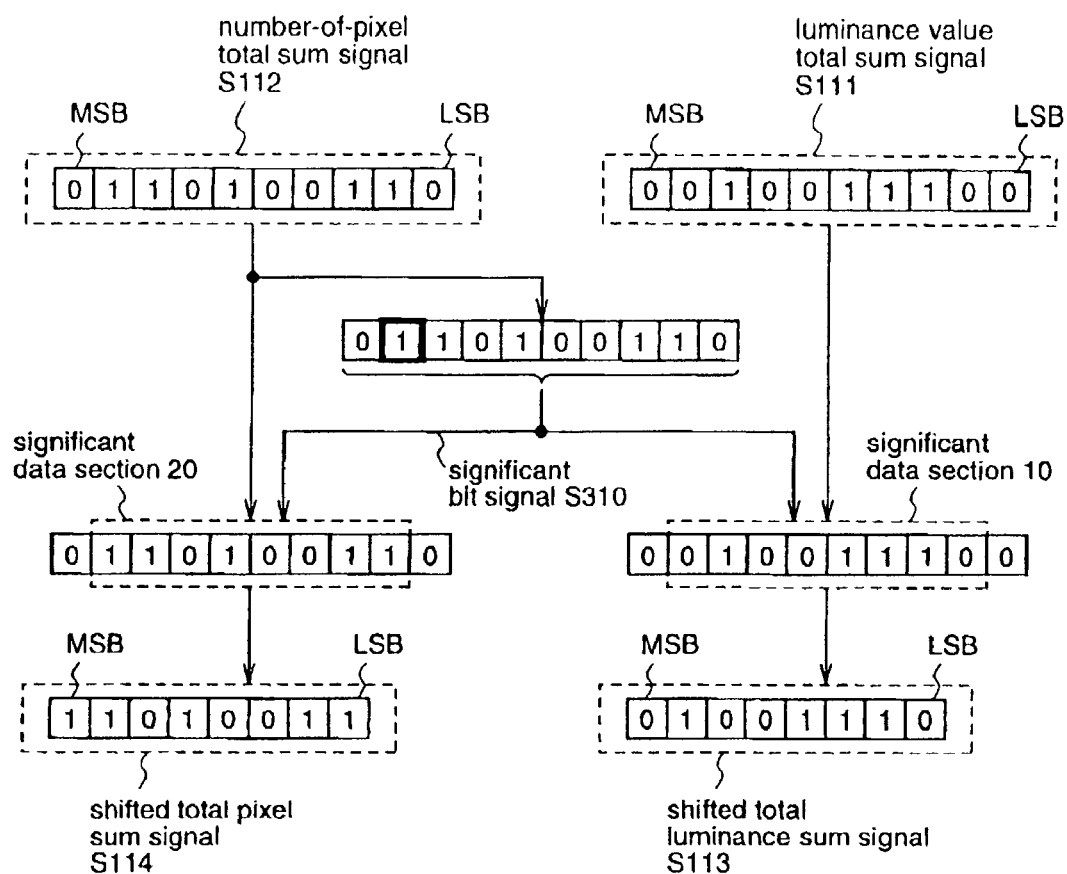
FIG. 4 is a diagram for explaining an operation of the bit shift unit according to the first embodiment.

FIG. 4 shows a specific example of the operation of the bit shift unit 104, which will be described hereinafter.

Here, it is assumed that the luminance value total sum signal Sill is 10-bit data which is represented as 1A6 in hexadecimal notation, and the number-of-pixel total sum signal S112 is 10-bit data which is represented as 9C in hexadecimal notation.

Initially, the significant bit detection unit 301 receives the number-of-pixel total sum signal S112, and performs bit shift successively from the MSB of the number-of-pixel total sum signal S112 toward lower-order bits. In FIG. 4, since the MSB is "0", the bit shift is performed toward the next bit that is the second bit from the MSB. Because the second bit from the MSB is "1", the significant bit detection unit 301 outputs a significant bit signal S310 indicating that significant data starts from the second bit from the MSB (bit enclosed by a black rectangle).

Then, the luminance value bit shift unit 302 receives the luminance value total sum signal S111 and the significant bit signal S310. Since the inputted significant bit signal S310 indicates that the significant data starts from the second bit from the MSB, when for example 8 bits are required for detecting the average luminance level, the luminance value bit shift unit 302 extracts a significant data section 10 of 8 bits starting from the second bit from the MSB of the luminance value total sum signal S111. The extracted significant data unit 10 is 4E in hexadecimal notation, resulting in a shifted total luminance sum signal S113.

The number-of-pixel bit shift unit 303 receives the number-of-pixel total sum signal S112 and the significant bit signal S310, and, when 8 bits are required for detecting the average luminance level, extracts a significant data section 20 of 8 bits starting from the second bit from the MSB of the number-of-pixel total sum signal S112. The extracted significant data section 20 is D3 in hexadecimal notation, resulting in a shifted total pixel sum signal S114.

As described above, the luminance signal processing apparatus according to the first embodiment of the present invention subjects the luminance value total sum signal S111 and the number-of-pixel total sum signal S112 to the bit shift, and detects the average luminance level on the basis of the shifted total luminance sum signal S113 and the shifted total pixel sum signal S114 comprising optimum significant bits. Therefore, average luminance levels according to plural video signal formats which have different numbers of significant pixels, such as 720p, 1080i, 525i, and 525p, can be detected by a small scale circuit with minimizing a rounded error, and with great accuracy.

In this first embodiment, the luminance value total sum signal S111 is 10-bit data and represented as 1A6 in hexadecimal notation, while the luminance value total sum signal may be data of any bits and may be represented in any numbering system. In addition, the number-of-pixel total sum signal S112 is 10-bit data and represented as 9C in hexadecimal notation, while the number-of-pixel total sum signal may be data of any bits and may be represented in any numbering system.

In this first embodiment, 8 bits are required in the luminance value bit shift unit 302 and the number-of-pixel bit shift unit 303, while the number of bits is not limited to 8 bits and any number of bits can be used in these units.

Further, in this first embodiment, the luminance signal S101 is inputted to the luminance value addition unit 102, while the luminance signal S102 may be passed through a low-pass filter and then inputted to the luminance value addition unit 102. In this case, since the luminance signal S101 is passed through the low-pass filter, noises are eliminated, and accordingly a more accurate average luminance level can be detected.

Embodiment 2

A luminance signal processing apparatus according to a second embodiment of the present invention will be hereinafter described. This second embodiment is different from the first embodiment only in the structure of the window pulse generation unit 101. Therefore, the window pulse generation unit 101 will be described with reference to FIG. 5.

Figure 5:
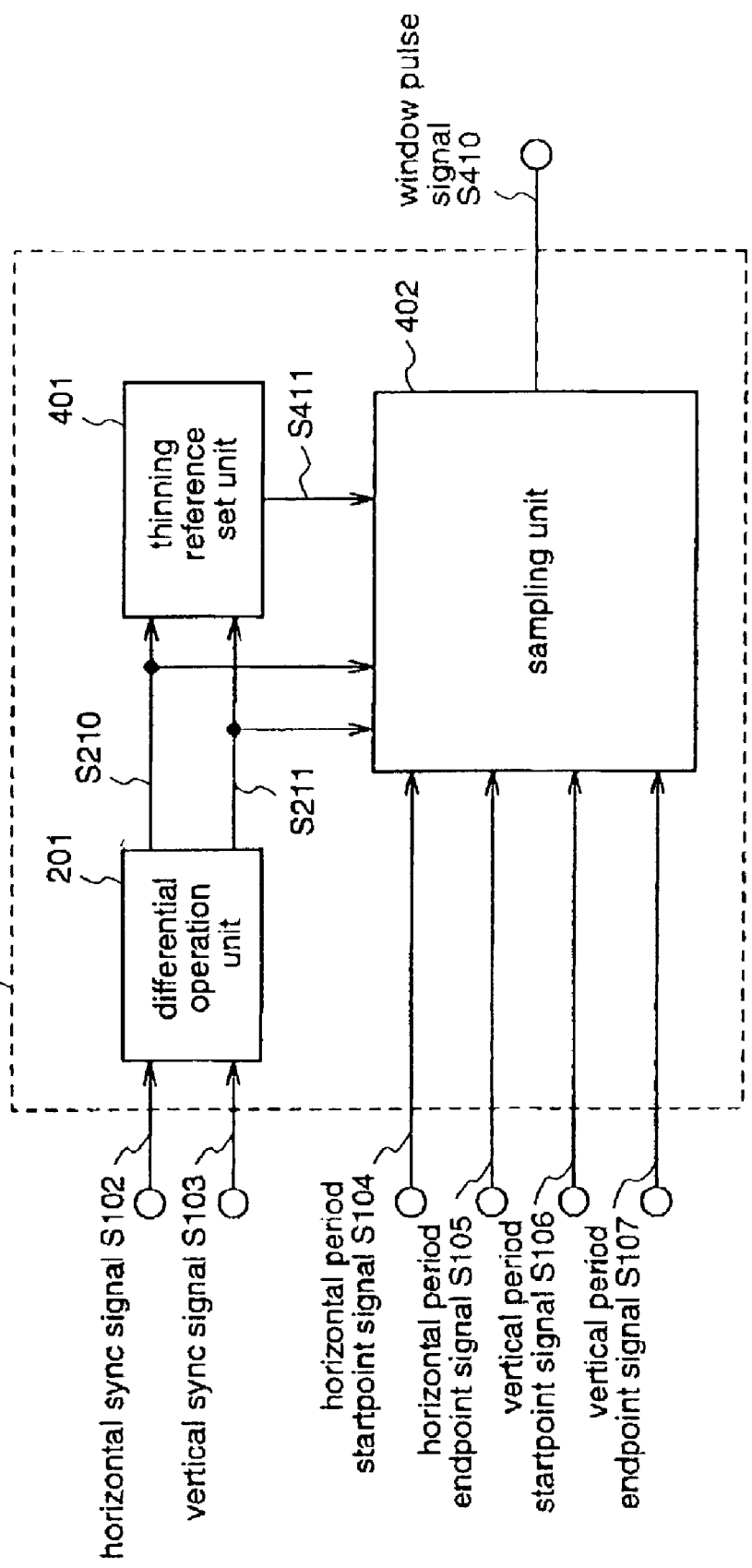
FIG. 5 is a block diagram illustrating a detailed structure of a window pulse generation unit according to a second embodiment of the present invention.

FIG. 5 is a block diagram illustrating the window pulse generation unit 101 according to the second embodiment.

The window pulse generation unit 101 receives the horizontal sync signal S102 and the vertical sync signal S103 which are extracted from the video signal, the horizontal period start point signal S104, the horizontal period endpoint signal S105, the vertical period start point signal S106 and the vertical period end point signal S107, and outputs a window pulse signal S410.

A differential operation unit 201 receives the horizontal sync signal S102 and the vertical sync signal S103 which are extracted from the video signal, detects a rising or falling edge of the horizontal sync signal S102, and outputs a differentiated signal, i.e., a horizontal differential signal S210. The differential operation unit 201 further detects a rising or falling edge of the vertical sync signal S103, and outputs a differentiated signal, i.e., a vertical differential signal S211.

Figure 6:
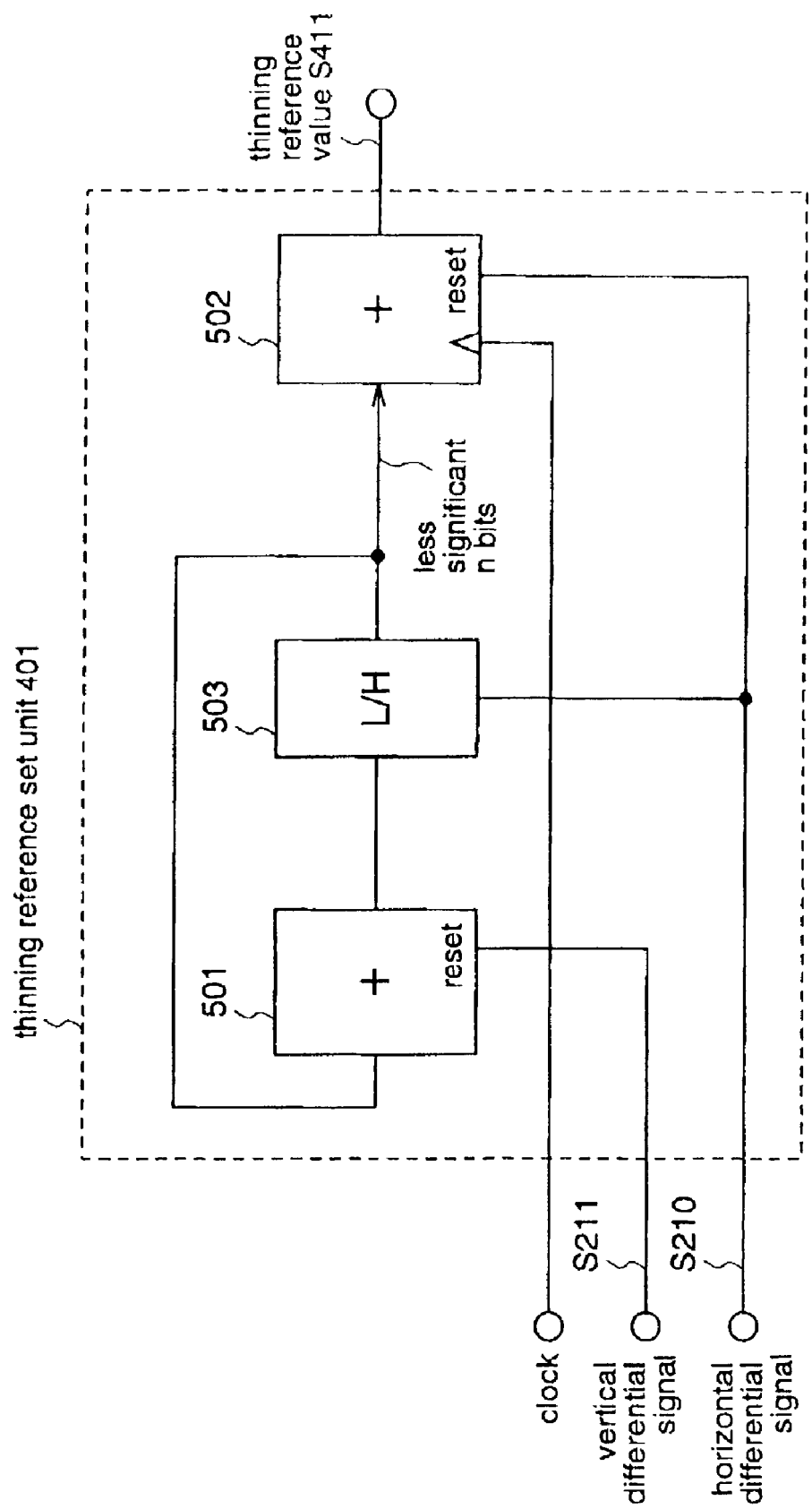
FIG. 6 is a block diagram illustrating a detailed structure of a thinning reference set unit according to the second embodiment.
Figure 8:
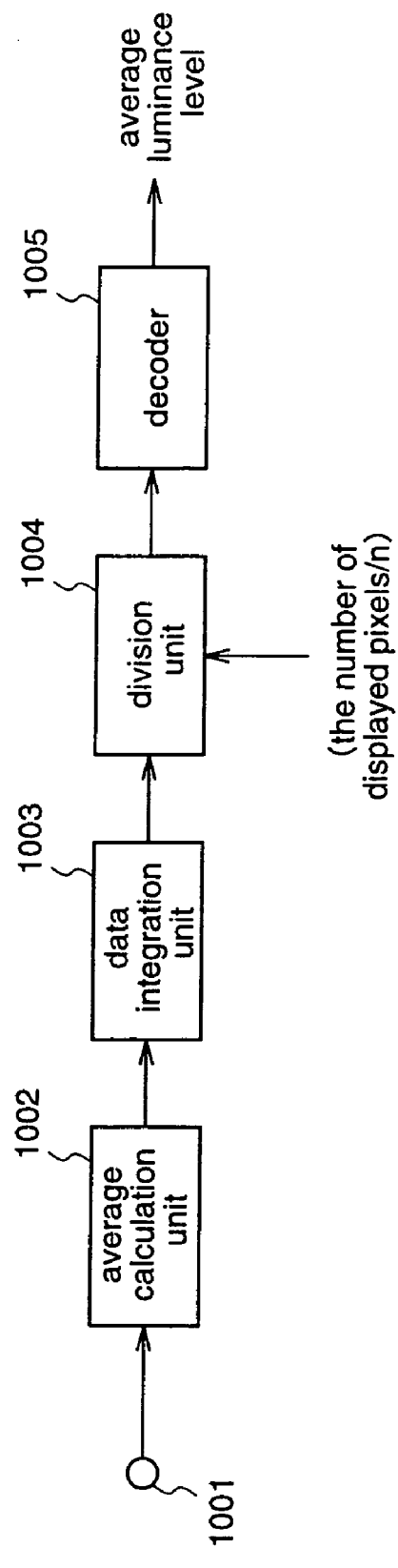
FIG. 8 is a block diagram illustrating a prior art video signal level detection apparatus.

A thinning reference set unit 401 receives the horizontal differential signal S210 and the vertical differential signal S211, and outputs a thinning reference value S411. Hereinafter, the thinning reference set unit 401 will be described with reference to FIG. 6.

The thinning reference set unit 401 is initially reset by means of a counter 501 in accordance with the vertical differential signal S211, then performs loading by a load/hold means 503 in accordance with the horizontal differential signal S210, and counts loaded values as inputs of the counter 501, thereby calculating the number of lines. Next, a number of bits to be extracted from the number of lines, which are outputted from the load/hold means 503, i.e., n bits, are extracted from less significant bits. Here, since the less significant bits are taken out from the output of the load/hold means 503, the values that can be extracted vary with line numbers by the number of hits extracted, i.e., n bits. For example, assuming that n=2, the extracted values change as follows: 0, 1, 2, 3, 0, 1, 2, 3, 0 . . . Next, taking the extracted less significant bits as an initial value in the counter 502, the counter 502 is reset in accordance with the horizontal differential signal S210, and counts a reference clock. In this case, since the counter 502 counts the reference clock taking less significant "n" bits which are outputted from the load/hold means 503 as the initial value, the values at which the counter starts counting vary with lines. The output of this counter 502 is a thinning reference value S411. Here, the counter 502 is a counter for the number of bits to be extracted, i.e., "n" bits.

Alternatively, the counter 501 may be the counter for the number of bits to be extracted, i.e., "n" bits.

For example, FIG. 7(a) shows the thinning reference value S411 in a case where less significant 2 bits are extracted from the counter 501 and the value of the 1st line is 00 in binary representation. FIG. 7(a) is a diagram showing the thinning reference value S411 to correspond to a display screen. One rectangular corresponds to one pixel on the display screen, and the vertical axis corresponds to lines. In FIG. 7(a), the values at which the counter starts counting vary with lines. To be more specific, the value of the thinning reference value S411 corresponding to the 2nd line is 01 in binary representation, the value of the 3rd line is 10 in binary representation, the value of the 4th line is 11 in binary representation, and the value of the 5th line is 00 in binary representation.

The sampling unit 402 receives the horizontal period start point signal S104, the horizontal period end point signal S105, the vertical period start point signal S106, the vertical period end point signal S107, the horizontal differential signal S210, the vertical differential signal S211 and the thinning reference value S411, and generates a window pulse signal S410 that indicates a period during which the luminance signal is sampled.

The sampling unit 402 is reset in accordance with the horizontal differential signal S210, and counts a reference clock, thereby calculating the horizontal period. Then, a significant period within the horizontal period, which is indicated by the horizontal period start point signal S104 and the horizontal period end point signal S105, is set as a horizontal window. In addition, the sampling unit 402 is reset in accordance with the vertical differential signal S211, and counts values that are loaded in accordance with the horizontal differential signal S210, thereby calculating the vertical period. Then, a significant period within the vertical period, indicated by the vertical period start point signal S106 and the vertical period end point signal S107, is set as a vertical window.

In this second embodiment, in order to extract values for sampling the luminance signal, the sampling unit 402 generates a thinning pulse on the basis of the thinning reference value S411. In this case, when the thinning reference value S411 matches a predetermined value, a pulse is generated, and this generated pulse is used as the thinning pulse. Here, the predetermined value is one of values corresponding to less significant bits which are extracted from the output of the counter 501, i.e., values which the bits to be extracted may take. For example, when less significant 2 bits are extracted from the output of the counter 501, the value corresponding to the bits to be extracted may take 0 to 3, and then a pulse is generated when the thinning reference value S411 matches one of these values. Therefore, the thinning pulse can be generated for each bit to be extracted.

A signal indicating a period which is common among the thinning pulse that has been generated as described above, the horizontal window, and the vertical window is set as the window pulse signal S410. This common period is a period during which the luminance signal is sampled.

Hereinafter, a description will be given of a specific example where the window pulse signal S410 is generated, with reference to FIGS. 7(a) to 7(c).

FIG. 7(a) is a diagram showing the thinning reference value S411 to correspond to the display screen, as described above. Here, assuming, for example, that a thinning pulse is generated when the thinning reference value S411 is 01 in binary representation, a window pulse signal S410 indicating a period that is common among the thinning pulse, the horizontal window, and the vertical window, is shown in FIG. 7(b). FIG. 7(c) is a diagram showing the window pulse signal S410 shown in FIG. 7(b) to correspond to the display screen. In this case, pixels corresponding to diagonally shaded areas are pixels within a period during which the luminance signal is sampled, indicated by the window pulse signal S410.

In this second embodiment, luminance values of the luminance signal in the period indicated by the window pulse signal S410 that is obtained as described above are added, and the average luminance level is detected.

As described above, according to the second embodiment, the window pulse generation unit 101 generates a thinning pulse on the basis of the thinning reference value S411 that is outputted from the thinning reference set unit 401, as well as generates the window pulse signal S410 indicating a period that is common among the horizontal window which is obtained by the horizontal differential signal S210, the horizontal period start point signal S104 and the horizontal period end point signal S105, and the vertical window which is obtained by the vertical differential signal S211, the vertical period start point signal S106 and the vertical period end point signal S107, and the thinning pulse, then adds luminance values within the period indicated by the window pulse signal S410 by means of the luminance value addition unit 102, and adds the numbers of pixels within the period indicated by the window pulse signal S410 by means of the number-of-pixel addition unit 103. Therefore, when the average luminance level is to be detected, the total sums of the luminance values and the numbers of pixels can be reduced, thereby reducing the circuit scale.

In this second embodiment, the thinning reference value comprises 2 bits, while the number of bits is not limited to 2 bits and this thinning reference value may comprise any number of bits which are to be extracted.

As described above, the luminance signal processing apparatus according to the present invention is suitable for detecting an average luminance level of a video signal, adaptively to various video signal formats having different numbers of significant pixels, such as 720p, 1080i, 525i, and 525p.

What is claimed is:

1. A luminance signal processing apparatus including:
    a window pulse generation means for generating a window pulse signal that indicates a period during which a luminance signal of an input video signal is sampled;
    a luminance value addition means for obtaining a total sum of luminance values of the luminance signal in the period indicated by the window pulse signal;
    a number-of-pixel addition means for obtaining the number of pixels in the period indicated by the window pulse signal;
    a bit shift means for detecting a significant bit from an output signal of the number-of-pixel addition means, and bit-shifting the output signal of the number-of-pixel addition means and an output signal of the luminance value addition means, respectively, on the basis of the significant bit; and
    a division means for dividing the bit-shifted output signal of the luminance value addition means, by the bit-shifted output signal of the number-of-pixel addition means, thereby obtaining an average luminance level in the period during which the luminance signal is sampled.

2. The luminance signal processing apparatus of claim 1 wherein
    the bit shift means includes:
    a significant bit detection means for shifting the output signal of the number-of-pixel addition means successively from its most significant bit, and detecting a significant bit;
    a number-of-pixel bit shift means for extracting a predetermined number of bits from the output signal of the number-of-pixel addition means on the basis of an output signal of the significant bit detection means; and
    a luminance value bit shift means for extracting the predetermined number of bits from the output signal of the luminance value addition means on the basis of the output signal of the significant bit detection means.

3. The luminance signal processing apparatus of claim 1 wherein
    the window pulse generation means includes;
    a differentiation means for detecting rising or falling edges of each of a horizontal synchronizing signal and a vertical synchronizing signal of the input video signal, differentiating said edges of each, and outputting a horizontal differential signal and a vertical differential signal, respectively;
    a thinning reference value set means that includes: a first counter which is reset in accordance with the vertical differential signal, and counts values which are loaded in accordance with the horizontal differential signal, thereby counting the number of lines; and a second counter for n bits, which is reset in accordance with the horizontal differential signal and counts a reference clock, taking a value corresponding to less significant n bits which are extracted from a value that is obtained by loading an output of the first counter, as an initial value, and outputs a value which is counted being shifted by one for each line, as a thinning reference value that is used when values of the luminance signal to be sampled are taken out; and
    a sampling means for receiving a vertical period start point signal, a vertical period end point signal, a horizontal period start point signal and a horizontal period end point signal, being reset in accordance with the vertical differential signal, obtaining a period indicated by the vertical period start point signal and the vertical period end point signal, within a vertical period that is obtained by counting values loaded in accordance with the horizontal differential signal, as a first significant period, further being reset in accordance with the horizontal differential signal, obtaining a period indicated by the horizontal period start point signal and the horizontal period end point signal, within a horizontal period that is obtained by counting a reference clock, as a second significant period, then generating a thinning pulse when the thinning reference value matches a predetermined value, and generating a window pulse signal indicating a period that is common among the first significant period, the second significant period and the thinning pulse.

* * * * *